(12) United States Patent
Kleyman

(10) Patent No.: US 9,672,544 B2
(45) Date of Patent: Jun. 6, 2017

(54) METHOD AND SYSTEM FOR PROVIDING ACCOUNTING SERVICES

(76) Inventor: Alexander Kleyman, Hallendale Beach, FL (US)

( * ) Notice: Subject to any disclaimer, the term of this patent is extended or adjusted under 35 U.S.C. 154(b) by 1093 days.

(21) Appl. No.: 12/691,521

(22) Filed: Jan. 21, 2010

(65) Prior Publication Data

US 2011/0078062 A1    Mar. 31, 2011

Related U.S. Application Data

(60) Provisional application No. 61/246,771, filed on Sep. 29, 2009.

(51) Int. Cl.
*G06F 17/22* (2006.01)
*G06Q 30/04* (2012.01)
*G06Q 40/00* (2012.01)

(52) U.S. Cl.
CPC ........... *G06Q 30/04* (2013.01); *G06Q 40/123* (2013.12)

(58) Field of Classification Search
CPC .............................. G06Q 30/04; G06Q 40/123
USPC ...................................... 705/31, 19
See application file for complete search history.

(56) References Cited

U.S. PATENT DOCUMENTS

| | | | | |
|---|---|---|---|---|
| 7,200,569 B2* | 4/2007 | Gallagher | ............ | G06Q 20/207 705/19 |
| 7,809,614 B2* | 10/2010 | Von Drehnen | ......... | G06Q 20/10 705/19 |
| 7,895,097 B2* | 2/2011 | Dang | ................... | G06Q 30/06 705/30 |
| 7,925,553 B2* | 4/2011 | Banks et al. | .................... | 705/31 |
| 8,140,413 B2* | 3/2012 | Ramsey | ............ | G06Q 10/0635 705/31 |
| 8,577,760 B2* | 11/2013 | Rutsch | ................... | G06Q 40/02 705/31 |
| 8,725,604 B2* | 5/2014 | Knighton | ............... | G06Q 10/06 705/31 |
| 2003/0061131 A1* | 3/2003 | Parkan, Jr. | ...................... | 705/30 |
| 2005/0119955 A1* | 6/2005 | Dang et al. | ..................... | 705/31 |

OTHER PUBLICATIONS http://turbotax/intuit.com, retrieved from web.archive.org, archived Oct. 23, 2009 (29 pages).
http://hrblock.com, retrieved from web.archive.org, archived Nov. 17, 2009 (2 pages).

\* cited by examiner

*Primary Examiner* — Andrew Joseph Rudy
(74) *Attorney, Agent, or Firm* — DLA Piper LLP US

(57) ABSTRACT

A computerized system and method for preparing at least one tax return, including, but not limited to: accepting tax information, by at least one accounting module, for the at least one tax return from at least one user; processing the tax information, at the at least accounting module, so that at least one third party tax software application can utilize the tax information to calculate the at least one tax return; and providing calculated results of the at least one tax return, from the at least one accounting module, to the at least one user; wherein third-party software is utilized to calculate the at least one tax return so that the at least one accounting module does not need to calculate the at least one tax return.

12 Claims, 26 Drawing Sheets

The web server sends a request to the *Status Interpreter* to display the user a readable status of their tax return.

515

The *Status Interpreter* translates the response from the IRS (which contains a series of codes and flags as defined by IRS Publication 1345A) into a readable, user friendly and descriptive message for the user. This translated response is then sent back to the web server and displayed to the user.

520

- If the user's tax return has been accepted by the IRS, the web server provides a downloadable PDF to the user so they may print a copy for their records.

- If the user's tax return has been rejected by the IRS, the user will be able to correct any errors that the IRS reported and repeat the filing process (See "Filing Tax Return").

Passing through a separate, monitored & secure layer of security, customer service agents log into the system through an interface designed to manage and accommodate taxpayer inquiries and troubleshooting in a large scale environment.

610

Taxpayer calls in and is connected to a customer service agent

615

Agent pulls up taxpayer's account and is shown a summary of the requested return as well as filing status.

620

Using a variety of tools linked to the system and the taxpayer's database, customer service can accommodate many of the taxpayer's needs immediately, for more complex issues, a ticket may be opened and transferred to the correct department following a simple wizard.

625

Upon completion of the call, the customer service agent enters a summary of the taxpayer's call in a call log, so other agents may assist the taxpayer more thoroughly in future inquiries.

FIGURE 7

Form W-2

| b. Employer identification number | 1. Wages, tips, other comp. | 2. Fed. Income tax withheld |
| XX - XXXXXXXX | 30000 | 2000 | c. Employer's name, address and zip
XXXXXXXX
XXXXXXXX
XXXXXX , XXXXXX ▶ XXXXX

| 3. Social security wages | 4. Social security tax withheld |
| 30000 | 500 |

| 5. Medicare wages and tips | 6. Medicare tax withheld |
| 30000 | 100 | d. Employee's social security number
◉ Taxpayer  XXXXXXXXX

| 7. Social security tips | 8. Allocated tips |

| 9. Advance EIC payments | 10. Dependent care benefits |

| 11. Nonqualified plans |

| 13. Statutory  Retirement  3rd-party |
|     employee    plan      sick pay   |
|      □           □          □        | e. Employee's first name, initial, last name, city, state, zip
XXXXXXXXXXX
XXXXXXXXXXX
XXXXXXXXXXXXXXXXXXXXXXX

| 12a. - |
| 12b. - |
| 12c. - |
| 12d. - |

14.
$
$
$

| 15. State | 16. State wages | 17. State tax | 18. Local wages | 19. Local tax | 20. Locality name |
| -State- ▶ | | | | | |
| -State- ▶ | | | | | |

Employer ID

Save

FIGURE 8

Calculation Results

| | |
|---|---|
| Adjusted Gross Income (AGI): | $30000.00 |
| Total Tax: | $710.00 |
| Federal Tax Withheld: | $2000.00 |
| Refund: | $3121.00 |

[ Preview Your 1040... ]

[ Edit Return... ]

If you need to change the above information.

[ Continue... ]

If you are satisfied with the results above.

Return Summary

Filing Status: Single
Dependents: 2
Form W-2:  1

FIGURE 9

Your Return's Status

The IRS has accepted your return on January 17, XXXX. They will deposit your tax refund into your bank account on January 30, XXXX.
Download & Print your Tax Return
You will need Adobe Acrobat to view this document.
You can download it for FREE by clicking here.
Having trouble printing? Click here for help.

Federal Refund: 1566.00

FIGURE 10

Your Return's Status

Your Tax Return has been rejected by the IRS.

The IRS has rejected your tax return for the reasons listed below. Please click the "Edit Return..." button to make any necessary changes. You may then resubmit your return

[ Edit Return... ]   or   [ Paper Return... ]

E-File Rejections

- Your W-2 and/or 1099R Employer ID does not match IRS Masterfile

If you entered all of your information correctly and your return is still being rejected you will have to file your Paper Return by mail.

- Taxpayer's prior year AGI does not match IRS masterfile.

As a digital signature, the IRS requires you to enter the Adjusted Gross Income (AGI) from your 2007 tax return.

You can find your AGI from your 2007 tax return on either
    - Form 1040 – Line 37
    - Form 1040A – Line 21
    - From 140EZ – Line 4
    - If you did not file a 2007 tax return, enter $0.00 as your AGI.

You can also get your AGI by calling the IRS at 1-800-829-1040.

FIGURE 22 nnnn****PRO  0000  PG01 123123123 200X12
[STAT]e[1322]RETIRED[1327]RETIRED[EMAL]USER@EMAIL.ADDRESS[FLST]2[HOME]7777777
777[PDOB]19000101[PNMA]JOHN[PNMB]J[PNMC]DOE[SDOB]19000101[SNMA]JANE[SNMB]D[
SNMC]DOE[SSSN]321321321[TRFE]5[WORK]777777777[dadd]123-456 789 ST [dcty]CITY
NAME[dsta]NY[dzip]12345[grp1]X#
nnnn****RET  1040  PG01 123123123
0000001[0000][0160]X[0163]X[0553]37845[C005]1[V002]0530[V003]0914[V004]1215[V101]1380[V
102]1380[V103]1380[V104]1380[VA03]NY[VB03]1708#
nnnn****XLR  8867  PG01 123123123 0000001[0100]X[0390]X#
nnnn****XLR  USIN  PG01 123123123 0000001[0000]#
nnnn****SCH  A1040  PG01 123123123
0000001[0000][0015]7784[8212]3476[8220]6962[CA03]SAFE DEPOSIT BOX[CA04]INVESTMENT
JOURNALS[CA05]COMPUTER HIGH
SPEED[CB03]275[CB04]568[CB05]180[PA03]CASH[PB03]5234[QA03]NON CASH
CONTRIBUTIONS[QB03]500[Y007]1652#
nnnn****SCHEIC1040  PG01 123123123 0000001[0000]#
nnnn****FRM  W-2  PG01 123123123 0000001[0035]321321321[0040]111234567[0050]CLINTON
COUNTY[0055]COMPANY ADDRESS ST[0070]COMPANY
CITY[0073]NY[0075]12345[0120]285[CA03]NY[CB03]11-1234567[CC03]285#
nnnn****FRM  1099R PG01 123123123 0000001[0020]UBS FINANCIAL INC[0025]COMPANY
ADDRESS DR[0030]COMPANY
CITY[0040]COUNTY[0042]NY[0044]12345[0050]111234567[0060]321321321[0100]P7 20692
MC[0110]9316[0120]9316[0160]1600[0190]7[0200]X#
nnnn****FRM  1099R PG01 123123123 0000002[0020]INVESTMENTS[0025]INSTITUTIONAL
OPERAT[0030]COMPANY ADDRESS PL[0040]COMPANY
CITY[0042]NY[0044]12345[0050]111234567[0060]123123123[0110]5220[0120]5220[0190]7#
nnnn****FRM  1099R PG01 123123123 0000003[0020]TRUST
NAME[0025]099PPW1[0030]TRUST ADDRESS[0040]TRUST
CITY[0042]NY[0044]12345[0050]111234567[0060]123123123[0110]3228[0120]3228[0190]7#
nnnn****FRM  1099R PG01 123123123 0000004[0020]RETIREMENT
COMPANY[0025]RETIREMENT SYSTEM[0030]COMPANY ADDRESS[0040]COMPANY
CITY[0042]NY[0044]12345[0050]111234567[0060]123123123[0110]3300[0120]3300[0160]1450[
0190]7#
nnnn****FRM  1099D PG01 123123123 0000001[0020]INVESTMENT
COMPANY[0060]123123123[0110]514[0120]514#
nnnn****FRM  1099D PG01 123123123 0000002[0020]INVESTMENT COMPANY
2[0060]123123123[0110]1250[0120]1250#
nnnn****FRM  1099I PG01 123123123 0000001[0020]INTEREST
COMPANY[0060]123123123[0110]53[0210]25#
nnnn****FRM  1099I PG01 123123123 0000002[0020]INTEREST COMPANY
2[0060]123123123[0110]731#
nnnn****FRM  1099I PG01 123123123 0000003[0020]INTEREST COMPANY
2[0060]123123123[0110]5502#
nnnn****FRM  1099I PG01 123123123 0000004[0020]INTEREST COMPANY
3[0060]123123123[0110]4035#
nnnn****FRM  1099I PG01 123123123 0000005[0020]INTEREST COMPANY
4[0060]123123123[0117]C[0240]5394#
nnnn****FRM  1099I PG01 123123123 0000006[0020]INTEREST COMPANY
5[0060]123123123[0117]C[0240]6963#
nnnn****FRM  8880  PG01 123123123 0000001[0000]#
nnnn****ST  US11  PG01 123123123 0000001[AA03]LEVEL 3
COMM.INC[AA04]NVIDA[AB03]YYYY0604[AB04]200X0509[AC03]200X1219[AC04]200X1209[AD0
3]305[AD04]1560[AE03]1960[AE04]4508#

Message Number: 103

IRS Date = %irsdate%
Date Received = %date$
Refund = %refund%
Prep Fee = %prepfee%
CC Purchase = %cc%
Check Date = %checkdate%
Check Reissue = %checkreplace%
PDF Link when Available - %pdf%
Check/Direct Deposit MSG = %check_or_dd_msg% (if check -> "mailed
      to you", if dd-> "Direct Deposited")
Check/Direct Deposit = %check_or_dd_msg% (if check -> "check", if dd-
>     "Direct Deposit")
Bank Declined Message - %bankdeclined%
State Refund/Owe information = %stateinfo%
Federal and or State Tax Return - %fed_andor_state%
AGI Correction from = %correct_agi%

The IRS has accepted your return on %irsdate%. Due to a prior year (s) IRS issue or other governmental obligation such as past due student loan or child support, the IRS is indicating that your refund may be delayed. Please call the Treasury Department at 1-800-304-3107 or the IRS at 1-800-829-1040 for more details.

Show Price?  ☑

Show Refund? ☑

FIGURE 26

Reject Code: 0370
Translation: An invalid dependent relationship or age. If you entered all of your information correctly and your return is still being rejected you will have to file your Paper Return by mail.

Reject Code: 0372
Translation: Due to the incorrect information for the dependent the Child Tax Credit is not allowed. If you entered all of your information correctly and your return is still being rejected you will have to file your Paper Return by mail.

Reject Code: 0373
Translation: Due to the incorrect information for the dependent the Child Tax Credit is not allowed. If you entered all of your information correctly and your return is still being rejected you will have to file your Paper Return by mail.

Reject Code: 0499
Translation: Your W-2 Employer ID does not match IRS Masterfile. If you entered all of your information correctly and your return is still being rejected you will have to file your Paper Return by mail.

Reject Code: 0500
Translation: Your Primary Social Security and Last Name do not match in IRS Masterfile. For assistance with rejects due to problems with SSNs, name controls or dates of birth you may call Social Security Administration at 1.800.772.1213. If you entered all of your information correctly and your return is still being rejected you will have to file your Paper Return by mail.

ial Patent Application No. 61/246,771, filed Sep. 29, 2009. The entire content of this application is herein incorporated by reference in its entirety.

METHOD AND SYSTEM FOR PROVIDING ACCOUNTING SERVICES

CROSS-REFERENCE TO RELATED APPLICATIONS

This application is based on and derives the benefit of the filing date of U.S. Provisional Patent Application No. 61/246,771, filed Sep. 29, 2009. The entire content of this application is herein incorporated by reference in its entirety.

BRIEF DESCRIPTION OF THE FIGURES

FIG. 5 illustrates a method of allowing a user to view a tax return status, according to one embodiment.

FIG. 6 illustrates details of how at least one customer service interface can be utilized, according to one embodiment.

FIGS. 7-21 and 23-24 illustrate example screen shots, according to various embodiments of the invention.

FIGS. 22 and 25-26 illustrate data that can be utilized in various embodiments of the invention.

DETAILED DESCRIPTION OF EMBODIMENTS

Figure 1:
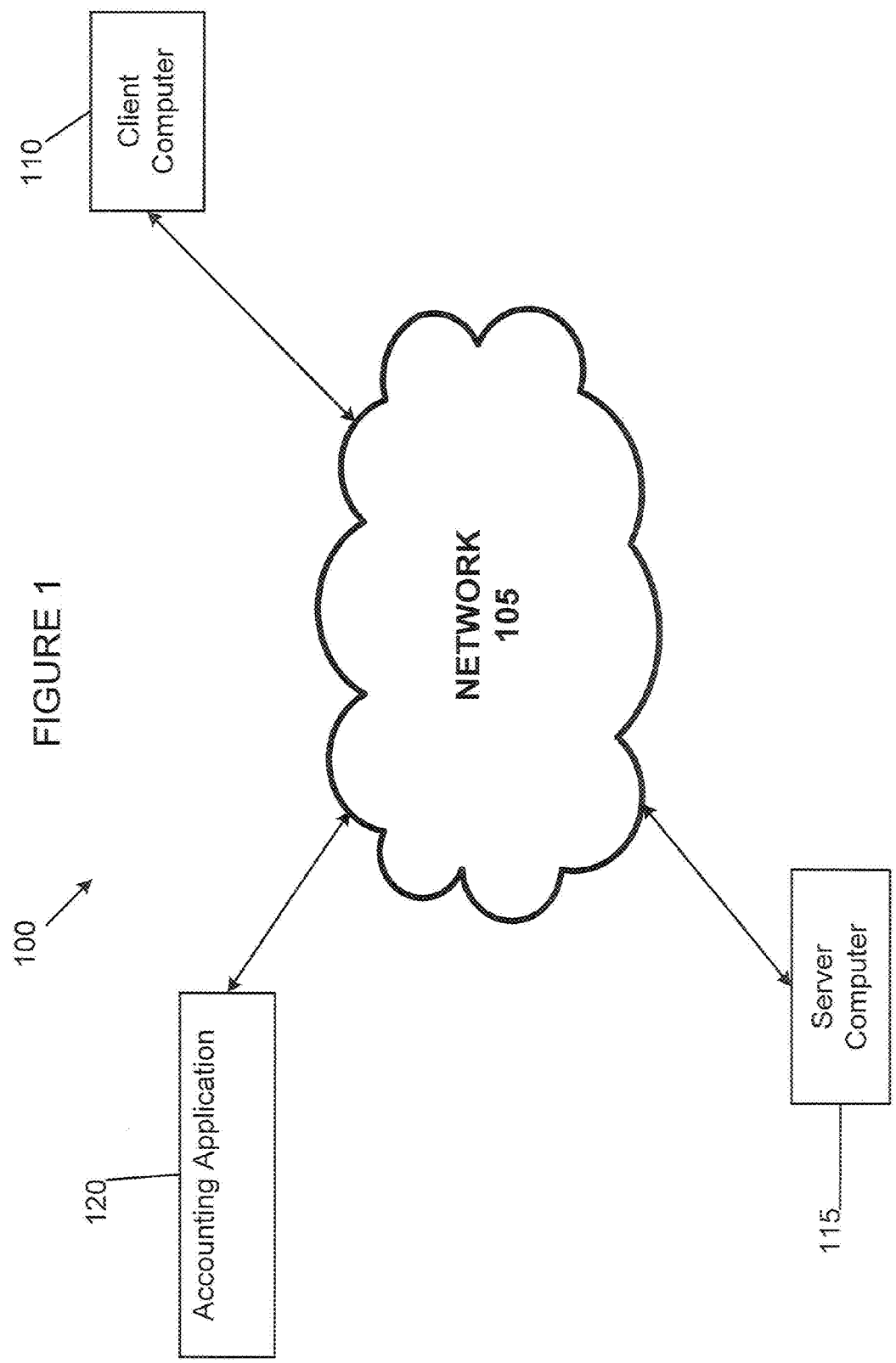
FIG. 1 illustrates a system for providing accounting services, according to one embodiment.

FIG. 1 illustrates a system for providing accounting services, according to one embodiment. The system 100 can include at least one client 110 connected to at least one server 115 through at least one network 105. At least one accounting application 120 can also be connected to the at least one client 110 and the at least one server 115 through the at least one network 105. The accounting application 120 can accept tax information from a user accessing the client 110. The accounting application 120 can also process the tax information and forward it to at least one third party tax software application so that the at least one third party tax software application(s) can utilize the tax information to calculate tax returns. The accounting application 120 can also make available calculated results of the tax return to the user. This can be done so that the accounting application 120 does not actually calculate the tax return, leaving this to the third party tax software application. This way, the at least one entity owning or running the accounting application 120 does not need to create their own tax software application. In addition, because the user is providing the information and filling out the forms, the user is actually preparing his or her own tax return.

In one embodiment, the accounting software 120 can provide the user with a choice of filing the return or recalculating the return (e.g., so that information can be added or errors can be corrected). In addition, the accounting software 120 can constantly take the data the user has entered, and calculate the results based on that data, so that the user can know the tax return results in real-time or near real-time.

In one embodiment, limited information about the calculated results can be provided to at least one call center representative. The limited information can include: whether or not a return has been filed, whether or not a return has been received, and the amount (e.g., owed, refundable) of the return. Those of ordinary skill in the art will see that many other types of information can be included in the limited information. The accounting software 120 can interpret the information entered by the user and the calculated tax return information and provide certain information that can be accessed by the call center representative. The call center representative could be trained in tax preparation or not trained in tax preparation. This information could be accessed by other applications. In addition, the accounting software 120 can provide certain information directly to a user via an automated phone system or via a user interface.

Figure 2:
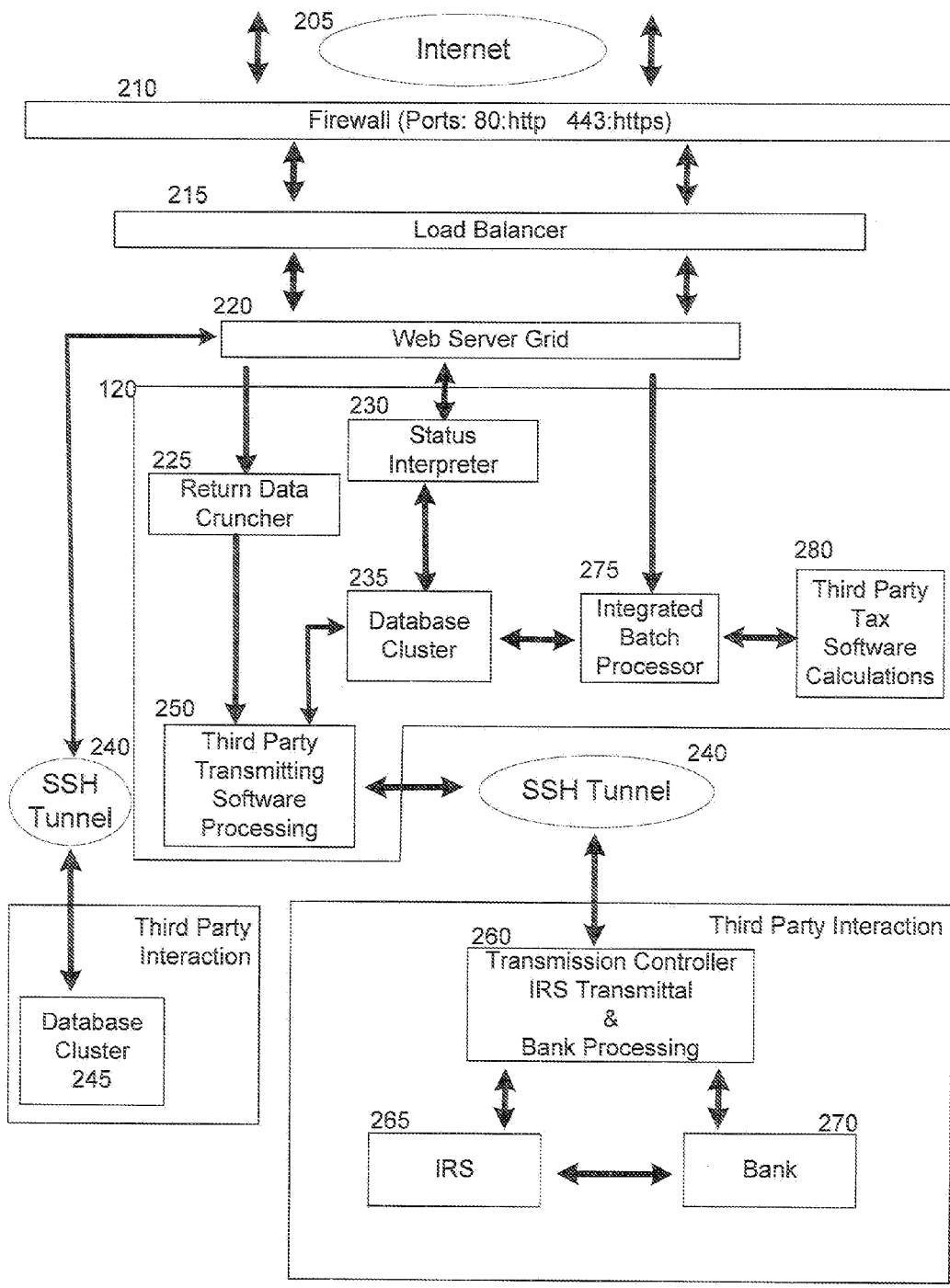
FIG. 2 illustrates additional details of a system for providing accounting services, according to one embodiment.

FIG. 2 illustrates additional details of a system for providing accounting services, according to one embodiment. A least one Internet 205 can be used as the network 105. At least one user can access the accounting application 120 from the client 110 via the Internet 205. At least one firewall 210 can separate the user's computer and internal processing servers. The firewall 210 can allow only the connections necessary to access the accounting application 120 (e.g., HTTP (port 80) and HTTPS (port 443). The exchange of any sensitive information can be handled by HTTP tunneling using at least one SSH tunnel 240 through 128-bit SSL encryption. Connections can be distributed through at least one load balancer 215, which can send traffic to the next available web server. This can allow for seamless growth of the infrastructure ensuring the user's experience is consistent no matter how many users access the website at once. At least one web server grid 220 can contain web servers, which can display an intuitive graphical interface to the user and act as an intermediary between the user and the accounting application 120.

The accounting application 120 can include at least one database cluster 235, at least one return data cruncher 225, at least one status interpreter 230, at least one integrated batch processor 275, and at least one other software applications provided by third parties. The database cluster 235 can include at least one database. In one embodiment, each user can have their own file or database. The return data cruncher 225 can format the data of the calculated tax return into an IRS e-file transmission file (e.g., as specified in IRS Publication 1345A). The formatted data can then be sent to the third party transmitting software (e.g., Software #2 (250)). Third party transmitting software 250 can be signaled by the return data cruncher 225 to transmit the file to the IRS and await a response.

The status interpreter 230 can display to the user a readable status of their tax return. In one embodiment, the status interpreter 230 can translate the response from the IRS (e.g., which can contain a series of codes and flags as defined by IRS publication 1345A) into a readable, user friendly and descriptive message for the user. This translated response can then sent back to the web server grid 220 and displayed to the user.

The integrated batch processor 275 can collect the user's information and process it into a format readable by third party tax software (e.g., Software #1). The formatted data can then be sent to the third party tax software, which can run the calculations and return a calculated tax return.

The third party software can interact with the web server grid 220, which in turn can interact with the accounting application 120. For example, at least one software application (e.g., #1 (280)) can do the accounting and calculate the tax information. As another example, at least one payment controller 245 can interact with processing software (e.g., #2 (250)) and the accounting application 120 in order to process payments (e.g., for using the accounting services).

Additionally, at least one transmission controller 260 can interact with the accounting application 120, the IRS 265, and at least one bank 270 to process payments to the IRS from a taxpayer.

A user may access the accounting application 120 to prepare their tax return, file their tax return, or check the status of their tax return. These processes are discussed in more detail below.

Figure 3:
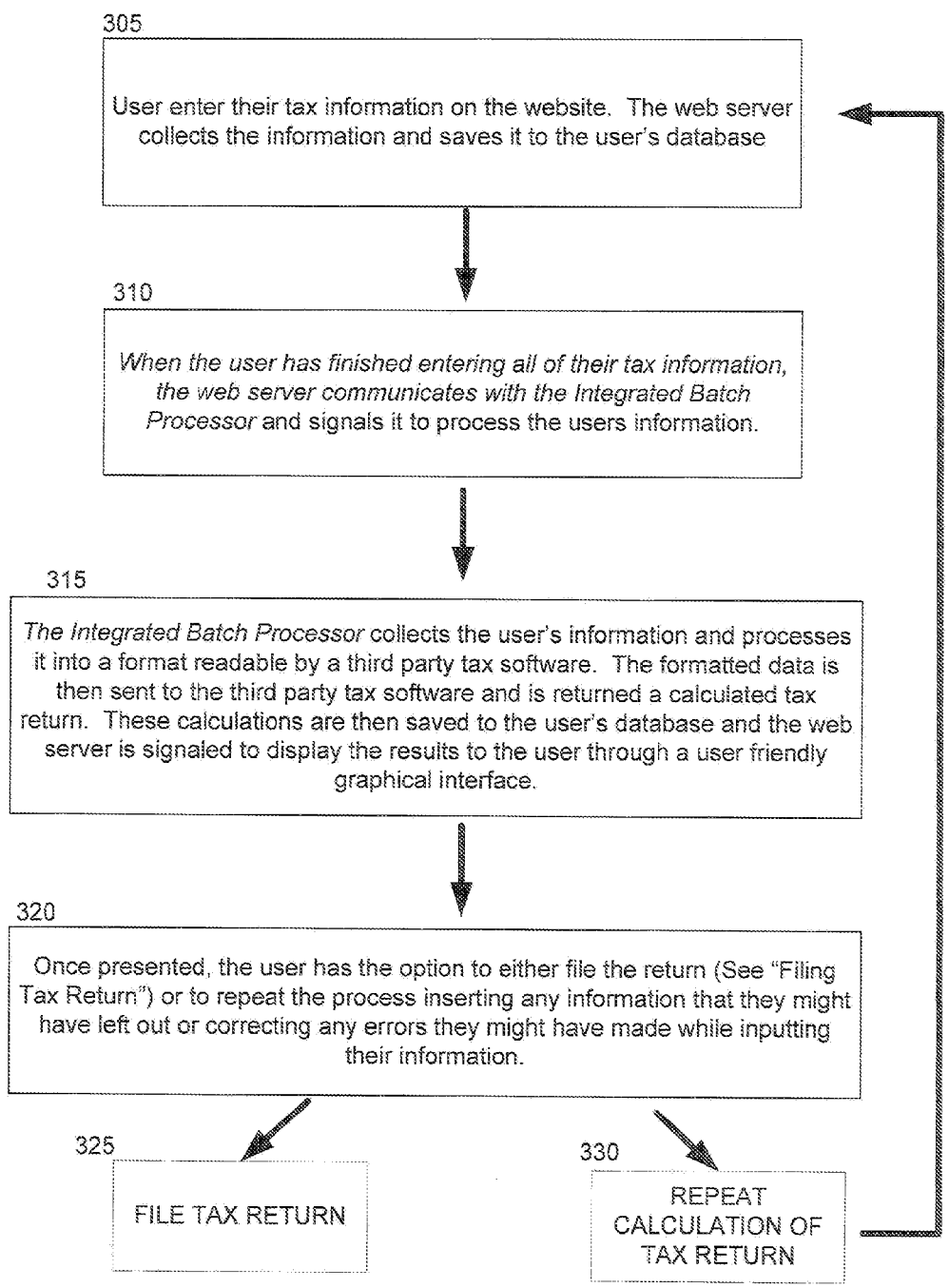
FIG. 3 illustrates a method for providing accounting services, according to one embodiment.
Figure 23:
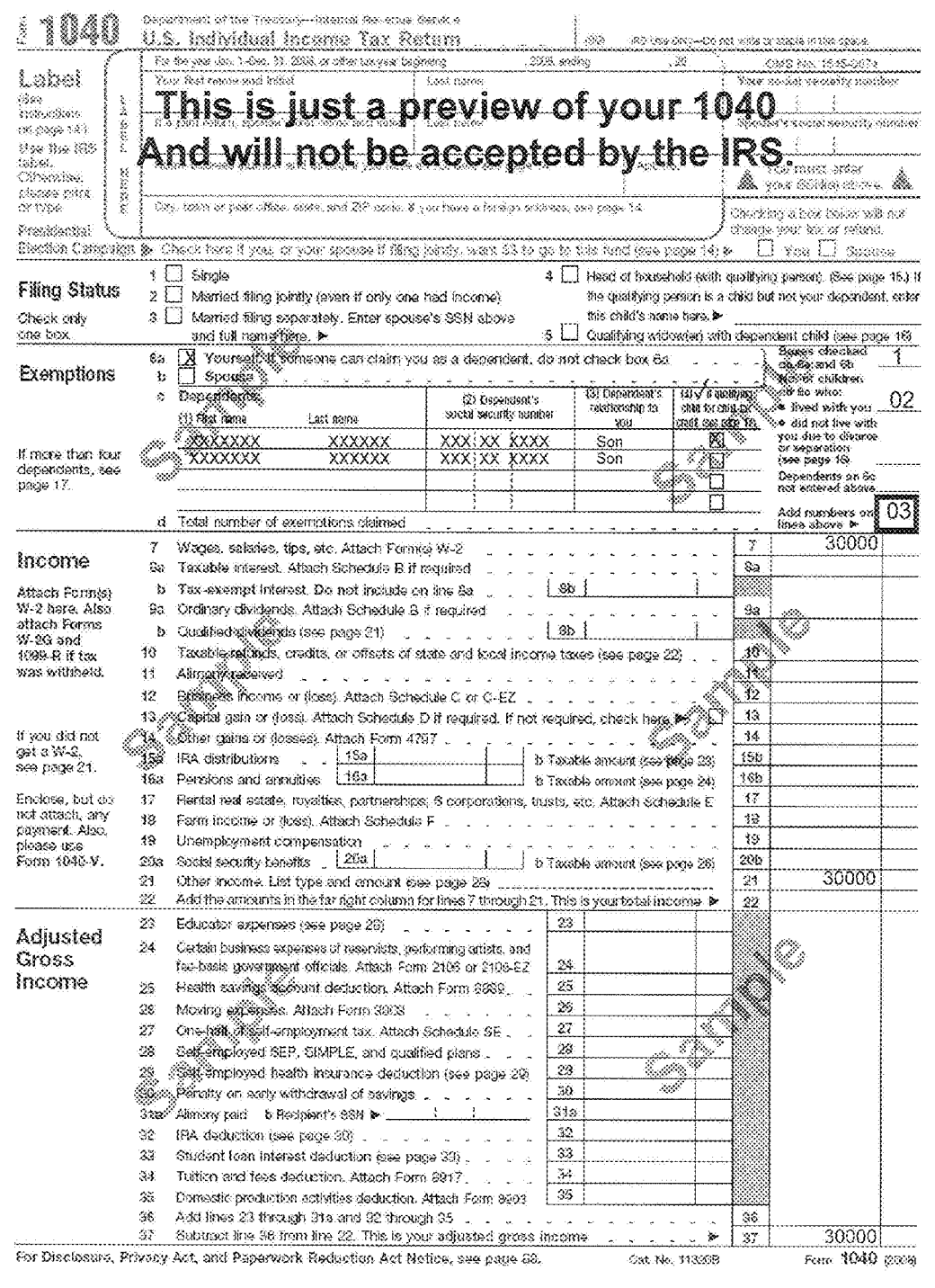
Figure 24:
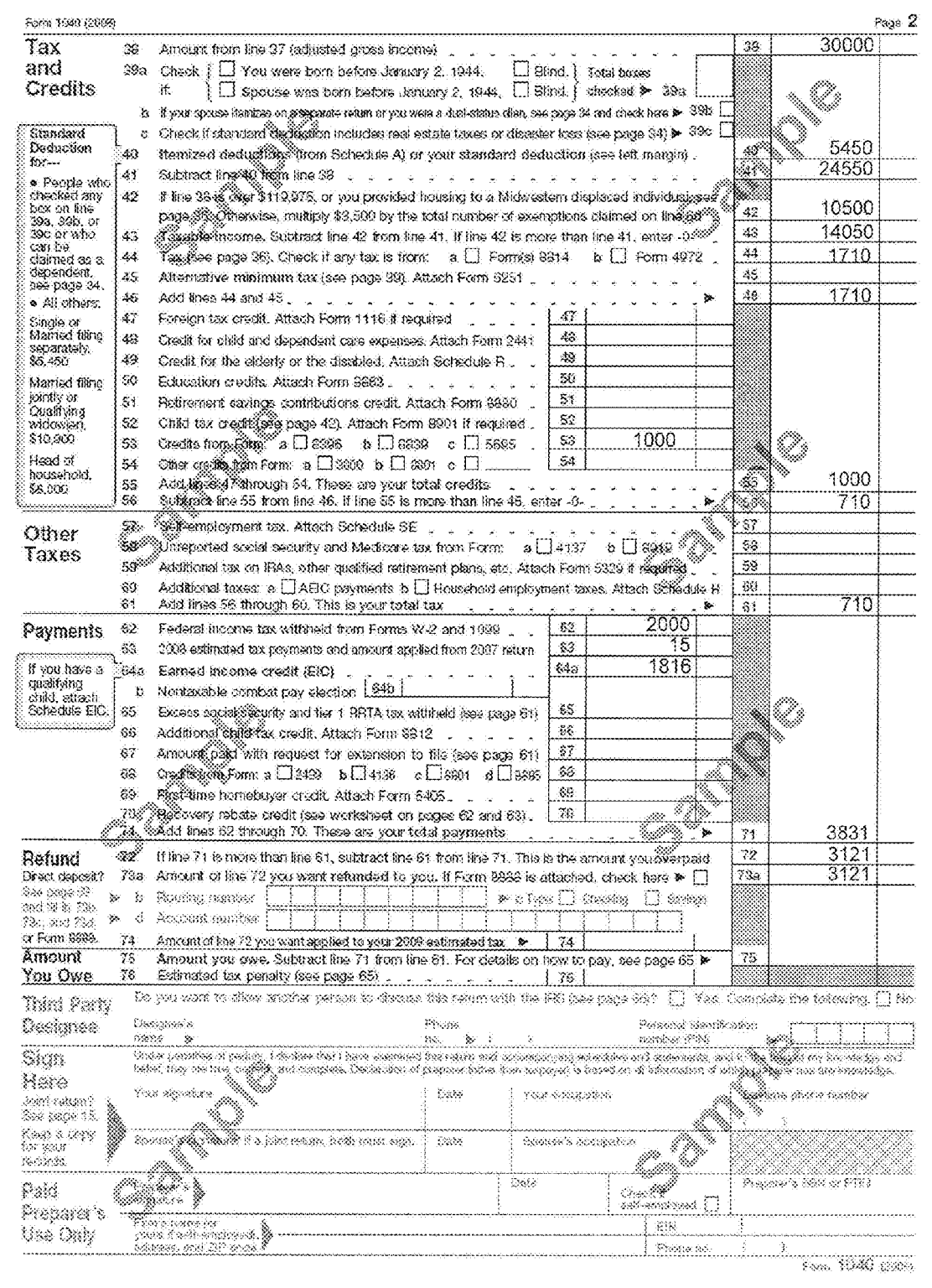

FIG. 3 illustrates a method for providing accounting services, according to one embodiment. In 305, a user enters his/her tax information on a website. The website could be run at the client 110, the server 115, or on both. An example of some data that can be entered is shown in FIG. 7. Note that additional tax-related information can be entered by a screen such as the one shown in FIG. 7. The web server grid 220 can collect the information and save it to at least one database in the database cluster 235. In 310, after the user has finished entering the tax information, the web server grid 220 can communicate with the integrated batch processor 275 and signal it to process the user's information. In 315, the integrated batch processor 275 can collect the user's information and process it into a format readable by third party tax software (e.g., Software #1). FIG. 22 illustrates an example of user entered data formatted in a manner that can be imported into third party tax software. The formatted data can then be sent to the third party tax software, which can run the calculations and return a calculated tax return. In 320, once the calculated tax return is presented to the user, the user has the option to either file the return or repeat the process of calculating the tax return by inserting any information that may have been left out, or by correcting any errors that might have been made while inputting the information. FIG. 8 illustrates an example of a calculated tax return. The user can choose to preview their 1040, edit their return, or continue to save and file their return. FIGS. 23-24 illustrate an example of a 1040 preview. If the user chooses to continue and file the return, the process moves to 325, which is discussed in more detail in FIG. 4. If the user chooses to repeat the calculation of the tax return, the process moves to 330, which returns the user to 305 so that the process can be repeated.

Figure 4:
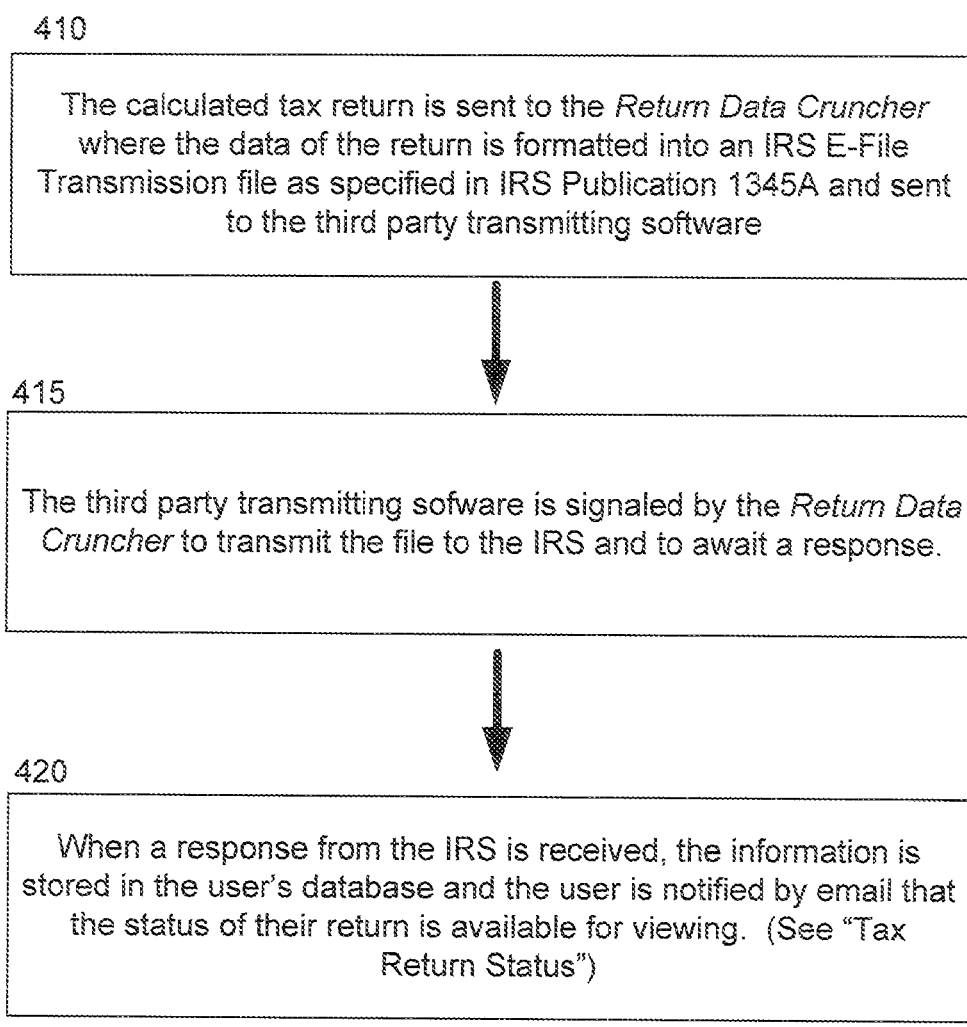
FIG. 4 illustrates details related to how a tax return can be filed, according to one embodiment.

FIG. 4 illustrates details related to how a tax return can be filed, according to one embodiment. In 410, the calculated tax return is sent to the return data cruncher 225, where the data of the calculated tax return is formatted into an IRS e-file transmission file. This can be done by analyzing the information the taxpayer has submitted and generating the appropriate IRS file. IRS Publication 1345 and 1345A, for example, could be followed to create correct file headers for each tax form with accompanying field data pertaining to each form.

The formatted data can then be sent to the third party transmitting software (e.g., Software #2 (250)). In 415, the third party transmitting software 250 can be signaled by the return data cruncher 225 to transmit the file to the IRS and await a response. In 420, when a response from the IRS is received, the information can be stored in the user's database in the database cluster 235, and the user can be notified by email that the status of their return is available for viewing. The process of viewing the tax return status is described in FIG. 5.

FIG. 5 illustrates a method of allowing a user to view a tax return status, according to one embodiment. In 510, the web server can send a request to the status interpreter 230 to display to the user a readable status of their tax return. In 515, the status interpreter 230 can translate the response from the IRS (e.g., which can contain a series of codes and flags as defined by IRS publication 1345A) into a readable, user friendly and descriptive message for the user. FIG. 22 illustrates example code received by the IRS, and custom defined translations for the code to be given to the user in a user-friendly message. This translated response can then sent back to the web server grid 220 and displayed to the user.

In 516, it is determined if the translated response is "accepted" or "rejected" by reviewing the code. It should be noted that status messages can be returned from the IRS with flags and numeric codes representing different aspects of the filed tax return (e.g., acknowledged, rejected, debt indicators, rejection reasons, etc.). FIG. 25 provides example codes that could be used by the IRS and translated in order to provide "accepted" or "rejected" information to the user.

The status messages can be parsed internally and translated into two categories: accepted and rejected. Accepted statuses can be translated into a readable message informing the taxpayer that their tax return has been accepted by the IRS. If the status comes back with a debt indicator defining prior unpaid obligations with the IRS, more information can be given to the taxpayer on how to rectify the issue. Rejected statuses can be translated into a readable message information the taxpayer that their tax return has been rejected by the IRS. Using the rejection codes provided by the IRS in the rejected status message, the taxpayer can be presented with a detailed synopsis for each of the reasons of rejection as well as information on how they can be corrected. FIG. 26 illustrates examples of rejection codes.

In 520, if the user's tax return has been accepted by the IRS, the web server provides a downloadable PDF to the user so they may print a copy for their records. FIG. 9 illustrates an example of a notice indicating the user's tax return has been accepted. If the user's tax return has been rejected by the IRS, the user can correct any errors that the IRS reported and repeat the filing process (see FIG. 4). FIG. 10 illustrates an example screen shot showing a notice indicating that the user's tax return has been rejected, according to one embodiment. The screen shot gives the user the option of editing the return or filing a paper return. If the user chooses the filing a paper return option, the user can print out the return and file it by mail. The reason(s) for the rejections can also be listed in the screen shot.

FIG. 6 illustrates details of how at least one customer service interface can be utilized, according to one embodiment. In 605, customer service agents can log into the system through an interface designed to manage and accommodate taxpayer inquiries and troubleshooting in a large scale environment. In 610, a taxpayer can call in and be connected to at least one customer service agent. In 615, the customer service agent can pull up the taxpayer's account and can be shown a limited information related to the requested return (e.g., filing status, amount, etc.). (Note that, in some embodiments, all of the information entered by the user can be accessed at a certain security level in read-only mode (e.g., by a manager).) In 620, the customer service agent can answer the taxpayer's questions. A variety of tools linked to the system and the taxpayer's database can be utilized for this. For more complex issues, a ticket may be opened and transferred to the correct department following a wizard. In 625, upon completion of the call, the customer service agent can enter a summary of the taxpayer's call in a call log, so other agents may assist the taxpayer more thoroughly in future inquiries.

Figure 11:
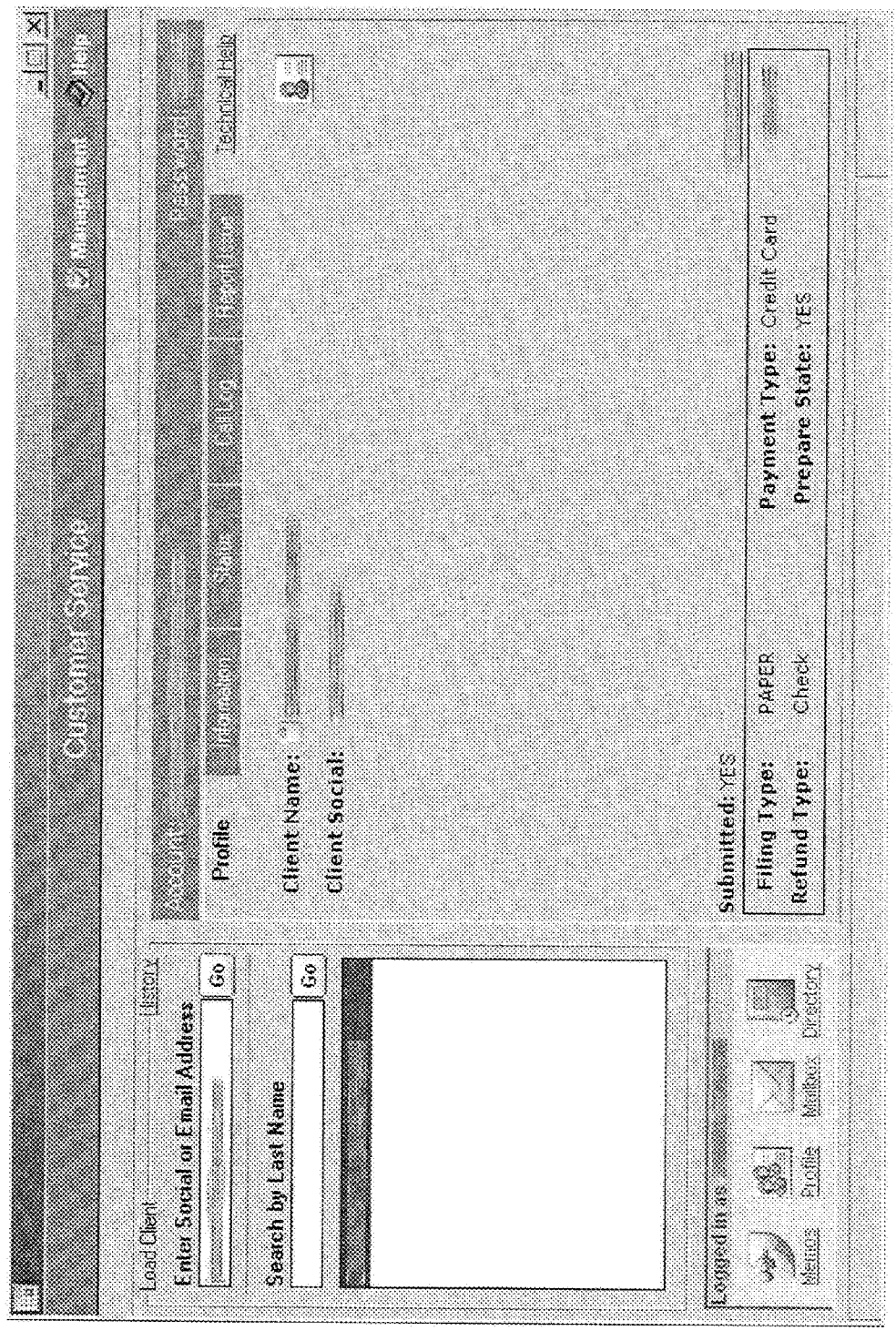
Figure 13:
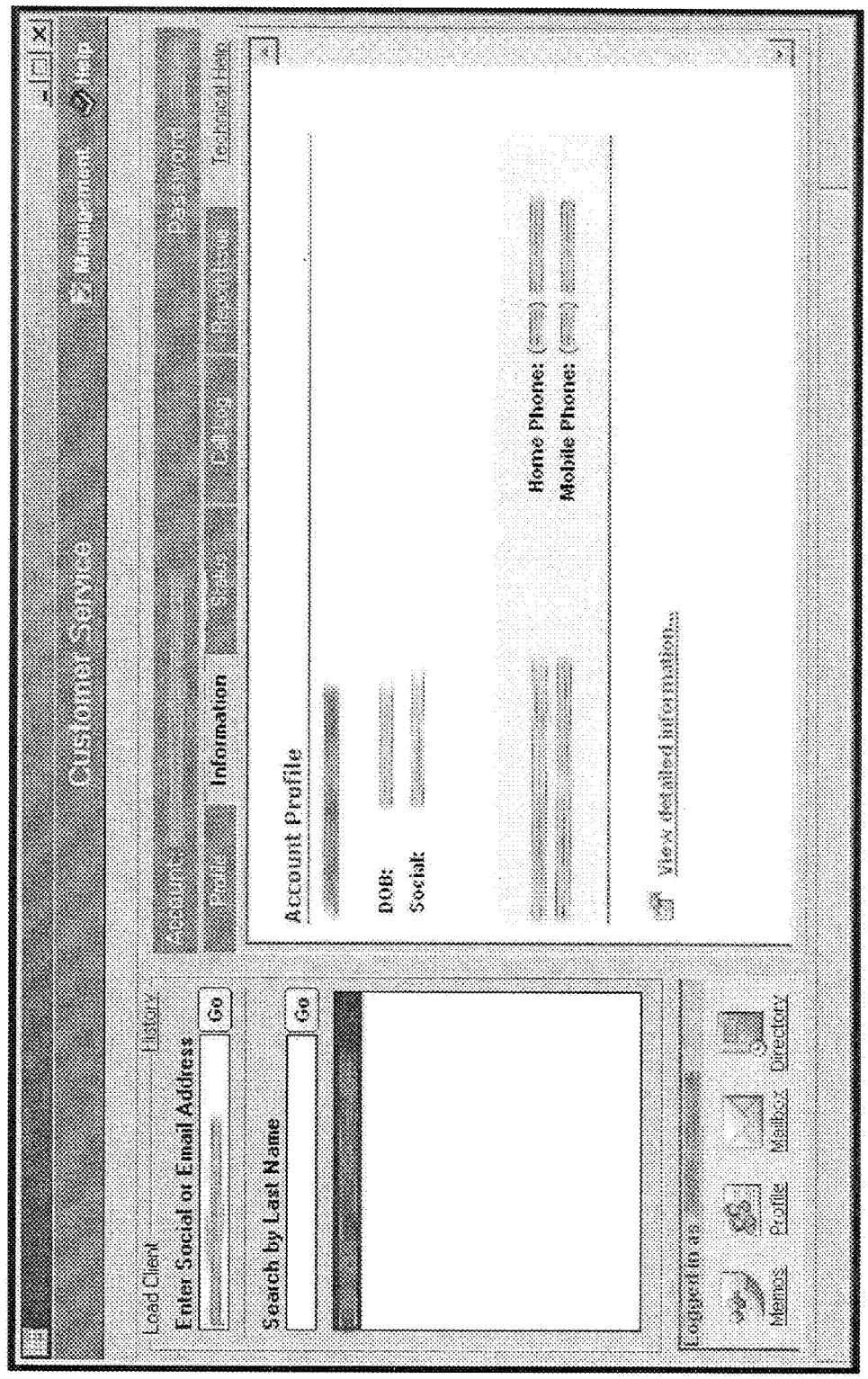
Figure 15:
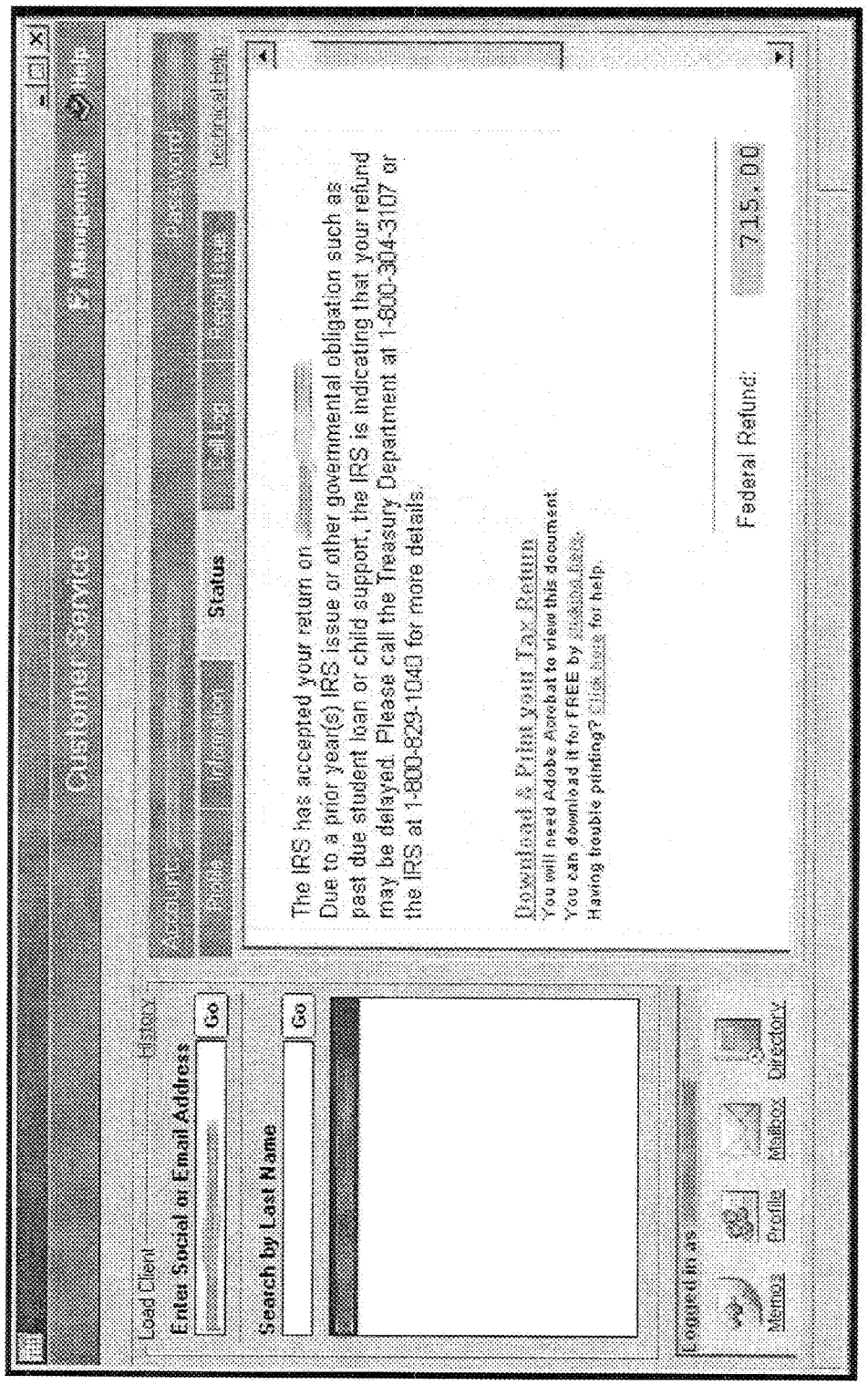
Figure 16:
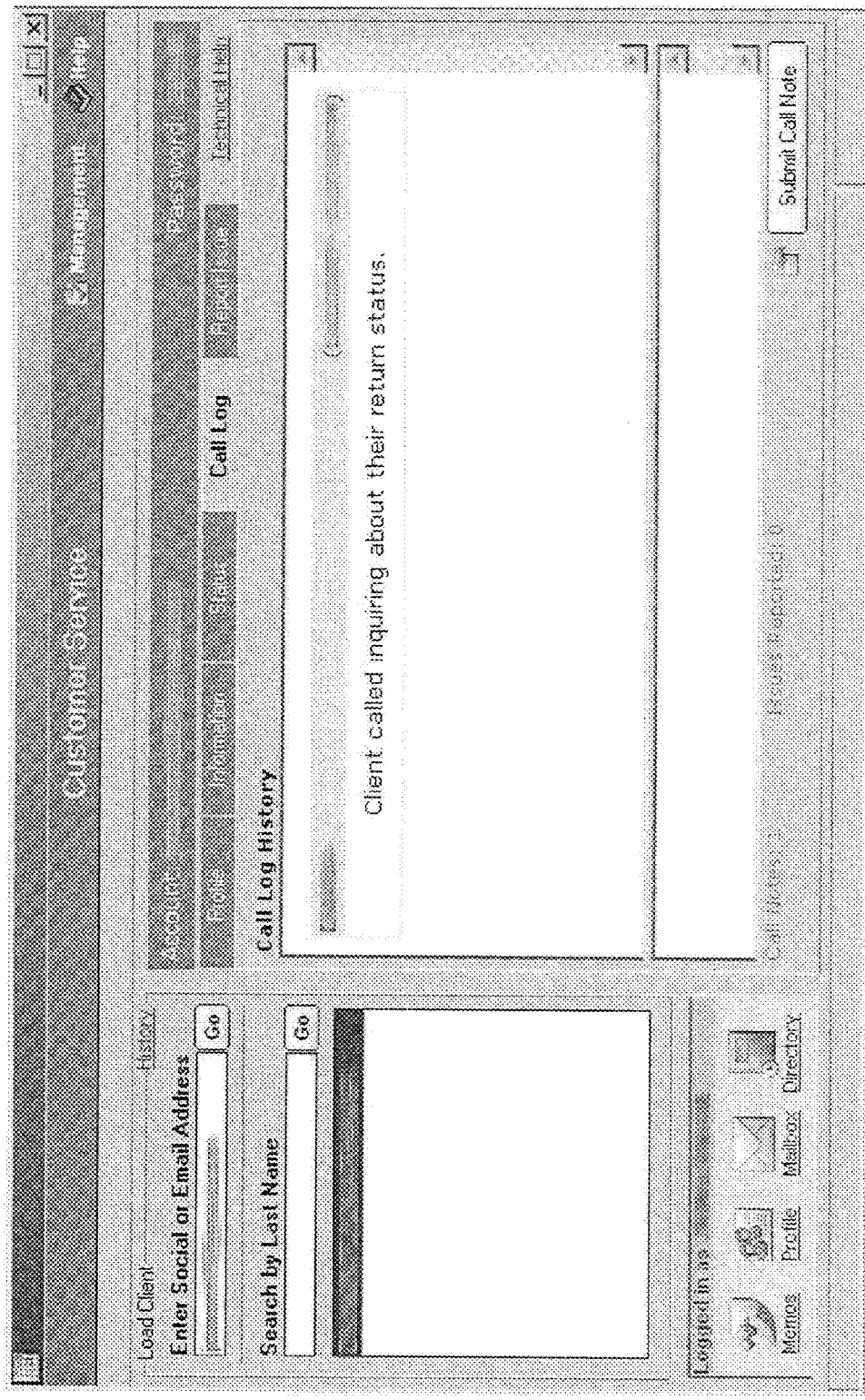
Figure 17:
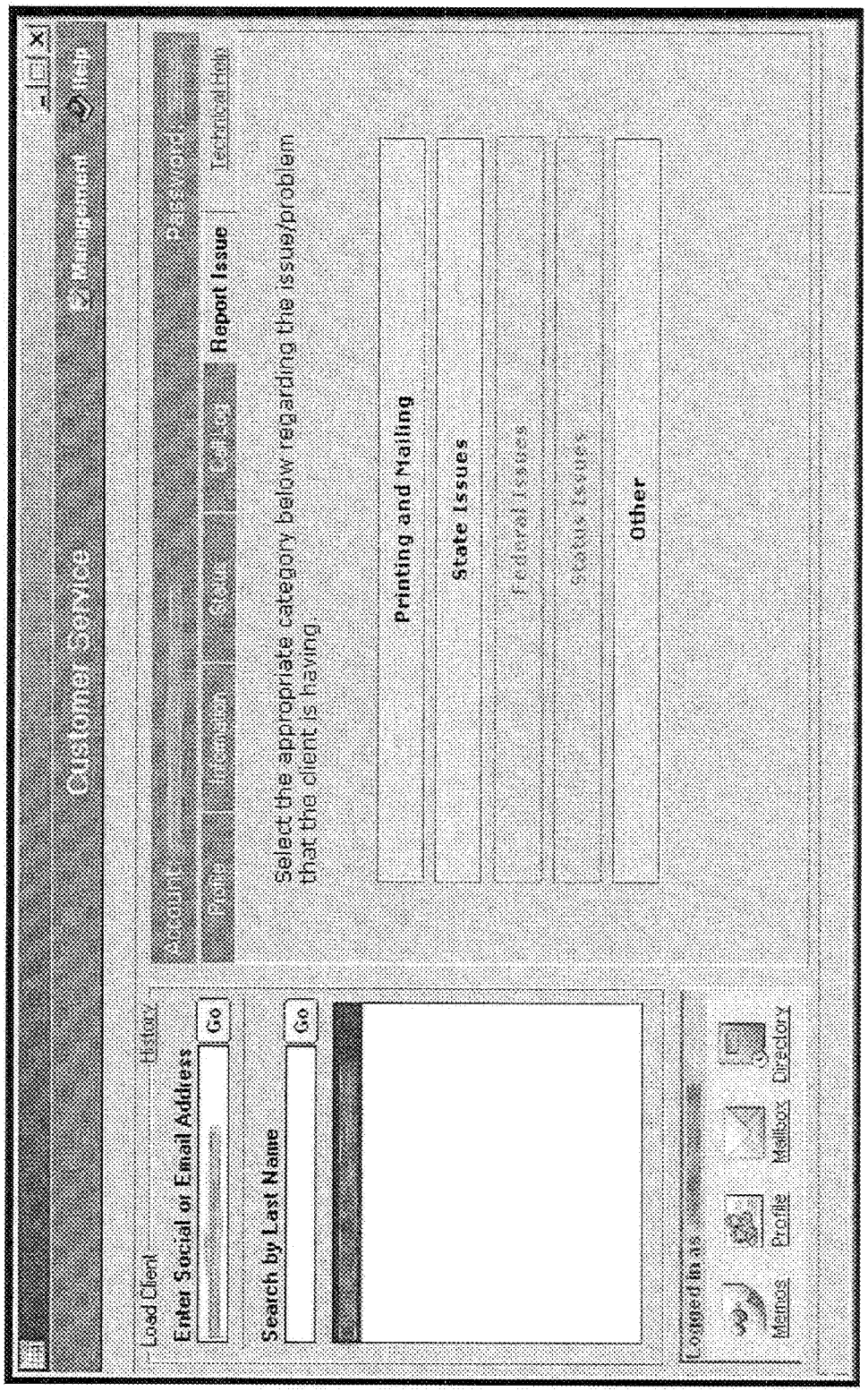
Figure 18:
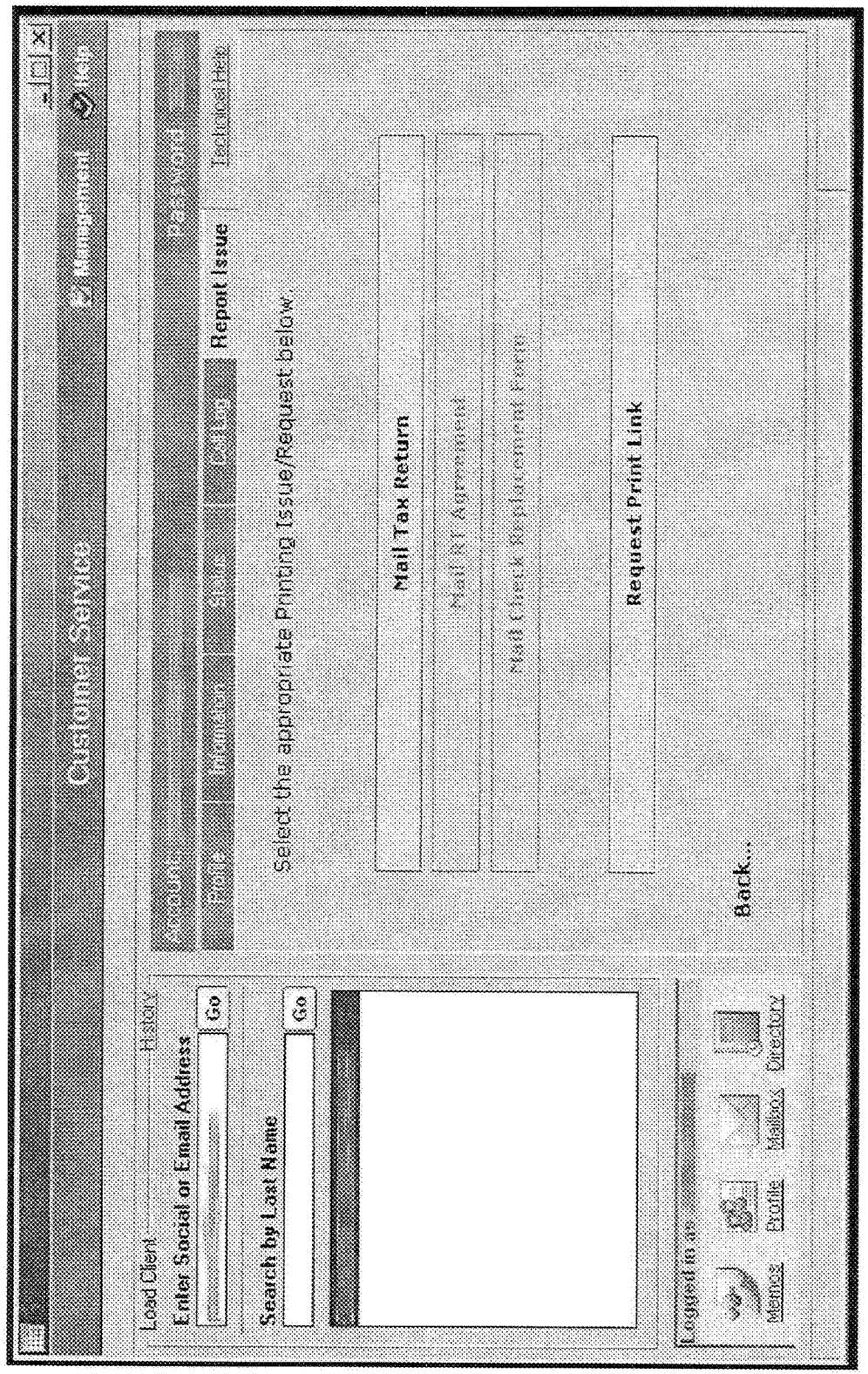
Figure 19:
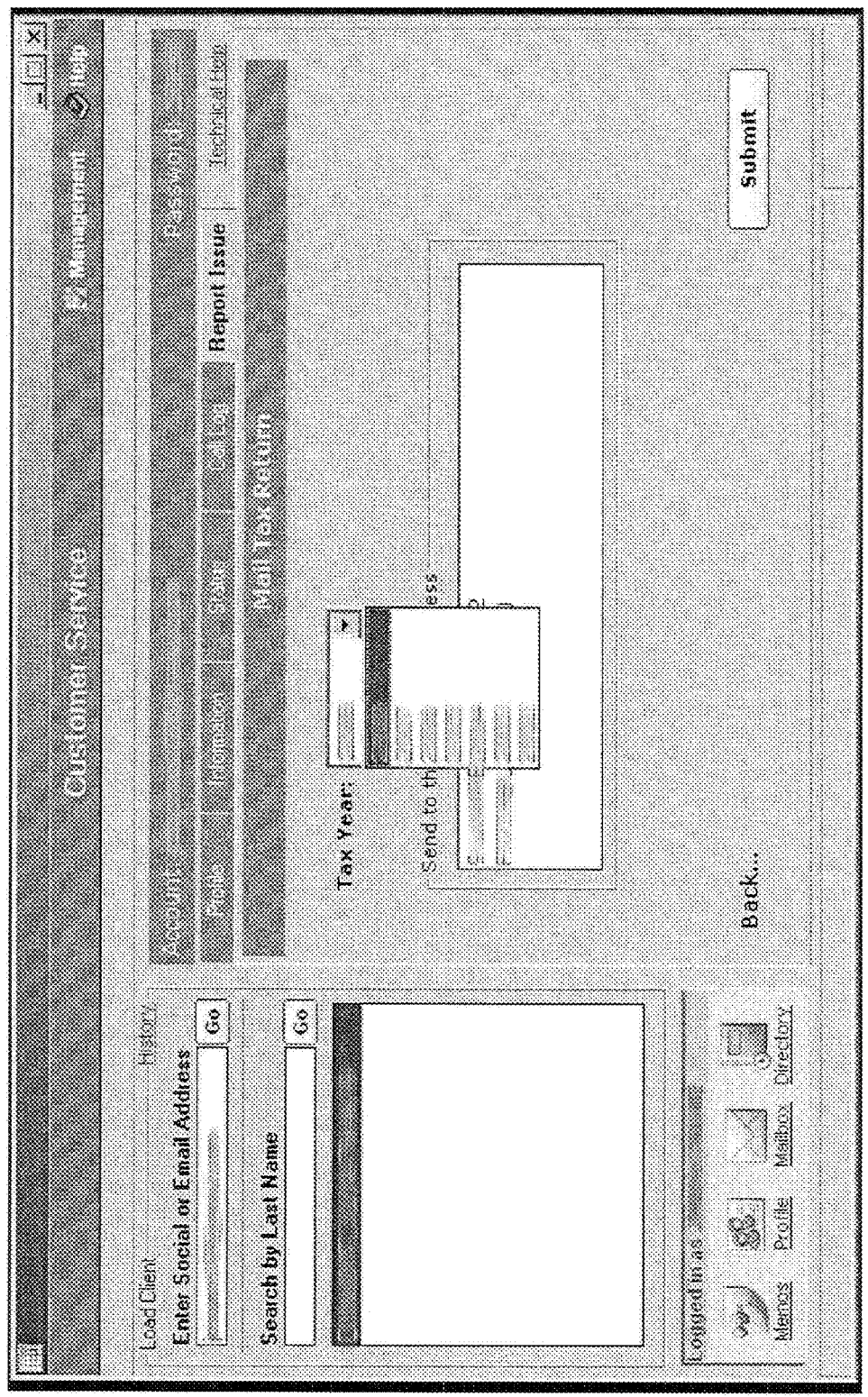
Figure 20:
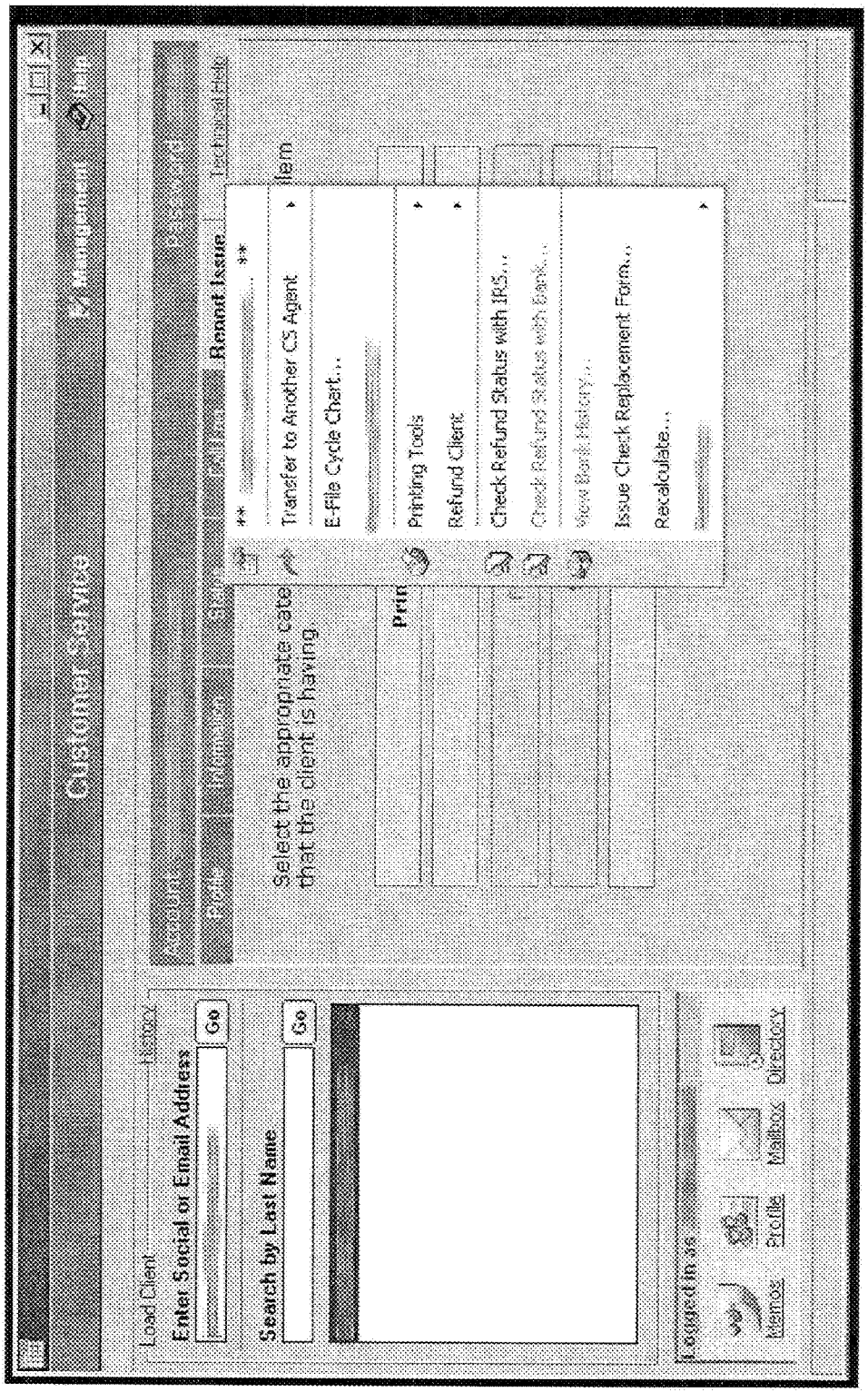
Figure 21:
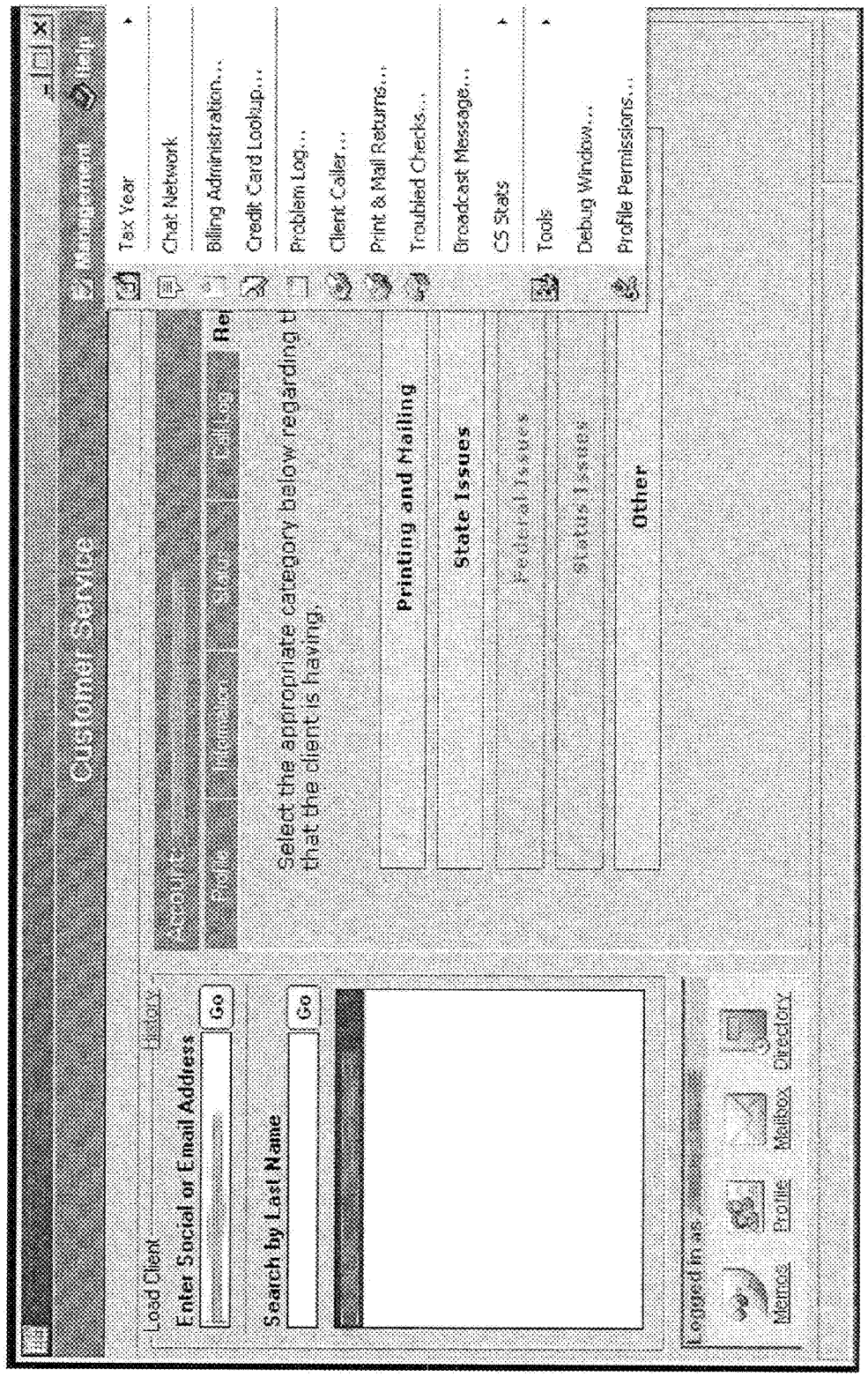

FIGS. 11-21 illustrate a user interface that can be utilized by a customer service representative (or even a user). FIG. 11 illustrates a screen shot showing information and action items related to the tax return. In particular, FIG. 11 illustrates the profile tab, which can provide a quick overview of the caller's account with enough information here to validate a user (e.g., name of client, social security number or partial social security number of client, status of return, etc.). FIG. 12 illustrates when a payment was paid and how (check, credit, etc.). FIGS. 13-14 illustrates the information tab, which can allow the customer service representative to view entered information in order to assist the caller with detailed account related issues as well as view the latest calculation results. The information tab can have account profile information, such as date of birth and social security information, and home/mobile phone information. In addition, calculation result information, filing status of the caller's tax return, and name and address information can be included. FIG. 15 illustrates the status tab, which can indicate the status of the caller's tax return. Detailed rejection and pricing information can also be available. FIG. 16 illustrates a call log tab, which can provide call log history (e.g., a client called about their return status). FIG. 17 illustrates a report issue tab, which can allow the customer service representative to document issues and requests that can no be executed immediately by the customer service representative. These issues and requests can be documented in an intuitive manner so that the issues and requests are forwarded to the correct departments. The report issue tab can have multiple categories (e.g., printing and mailing, state issues, federal issues, status issues, other issues). FIG. 18 illustrates various printing and mailing issues (e.g., mail tax return, mail agreement with entity running software application 120, mail check replacement form, request print link). FIG. 19 provides details on the mail tax return issue, which can indicate the tax year, and where the tax return should be mailed. Other screen shots can be provided that can provide technical help. For example, based on a strict set of account level rules, tools can be provided to the customer service representatives to perform more advanced operations such as issuing refunds and other account resolution actions. These tools can include transferring calls to other agents or managers. In addition different agent account permissions can be utilized. The higher level of access can be used to manage customer service and help provide quality assurance. Authorized users (e.g., managers, senior customer service representatives) can have access to billing information as well as other financial services such as tax refund resolution and charge reversals. Those of ordinary skill in the art will see that many other types of information can be included in the screen shots described above. FIG. 20 illustrates a menu drop-down of a "Technical Help" menu available to, for example, customer service representatives. This can provide customer service to advanced actions to be used when troubleshooting caller's accounts. FIG. 21 illustrates a menu drop-down for a "Management" button. This can provide advanced tools for administrators pertaining for more business orientated actions such as billing and problem diagnosis. While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages, are presented for example purposes only. The disclosed methodology and system are each sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

In addition, it is the applicant's intent that when any element of the system or method is described as "an" element, it is meant to include "at least one" of that element. For example, if "an" accounting application is described, "at least one" accounting application is also meant to be described.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A computerized method for preparing a plurality of tax returns for a plurality of users, including, but not limited to:
   performing processing associated with accepting tax information related to a tax return, by at least one calculating device comprising at least one batch processor module and at least one data cruncher module, for the plurality of tax returns, wherein each tax return is associated with at least one of the plurality of users, wherein the tax information is accepted using a connection distributed using a load balancer that sends traffic to an available web server enabling the plurality of users simultaneous access to the at least one calculating device;
   performing processing associated with processing the tax information, at the at least one batch processor module, so that at least one third party tax software application can utilize the tax information to calculate each of the plurality of tax returns;
   performing processing associated with providing the processed tax information, with the at least one batch processor module, to the third party tax software application so that the at least one calculating device does not need to prepare each of the plurality of tax returns;
   performing processing associated with receiving prepared results of each of the plurality of tax returns, at the at least one calculating device, from the third party tax software application;
   performing processing associated with providing the prepared results of each of the plurality of tax returns, from the at least one calculating device, to the user associated with each of the plurality of tax returns;
   performing processing associated with receiving, at the at least one calculating device, at least one command from at least one of the users to prepare and file at least one of the plurality of tax returns or to recalculate at least one of the tax returns;
   in response to the at least one command to file at least one of the plurality of tax returns, performing processing associated with processing the prepared results of the one of the plurality of tax returns to be filed, at the at least one data cruncher module, so that at least one third party transmitting software application can utilize the prepared results to prepare and file the one of the plurality of tax returns to be filed; and performing processing associated with providing the prepared results, with the at least one data cruncher module, to the third party transmitting software application so that each of the plurality of tax returns to be filed can be filed with at least one tax collecting entity.

2. The method of claim 1, wherein the at least one batch processor module further comprises at least one status interpreter module, the method further comprising:

performing processing associated with receiving, with the at least one status interpreter module, at least one response from at least one tax collecting entity in response to providing the prepared results;

performing processing associated with processing, with the at least one status interpreter module, the at least one response to generate at least one interpreted response comprising descriptive information derived from at least one code in the at least one response; and performing processing associated with providing the at least one interpreted response, from the at least one status interpreter module, to at least one of the users.

3. The method of claim 1, wherein the recalculating is done so that information can be modified or errors can be corrected.

4. The method of claim 1, further comprising:

providing limited information about the calculated results from the at least one web server to at least one call center representative.

5. The method of claim 4, wherein the limited information includes, but is not limited to:

whether or not a return has been filed;

whether or not a return has been received; the amount of the return; or any combination thereof.

6. The method of claim 1, wherein the at least one batch processor module constantly takes the tax information at least one user has entered, and calculates at least one of the tax return results based on the entered tax information, so that the at least one user can know the at least one tax return results prior to transmitting to the third party transmitting software application.

7. A computerized system for preparing a plurality of tax returns for a plurality of users, including, but not limited to:

at least one server and/or at least one client coupled to a network; at least one calculating device coupled to the at least one server and/or the at least one client, the at least one calculating device configured for:

performing processing associated with accepting tax information related to a tax return for the plurality of tax returns, wherein each tax return is associated with at least one of the plurality of users, wherein the tax information is accepted using a connection distributed using a load balancer that sends traffic to an available web server enabling the plurality of users simultaneous access to the at least one calculating device;

performing processing associated with processing the tax information so that at least one third party tax software application can utilize the tax information to calculate each of the plurality of tax returns;

performing processing associated with providing the processed tax information, with the at least one accounting module, to the third party tax software application so that the at least one calculating device does not need to prepare each of the plurality of tax returns;

performing processing associated with receiving prepared results of each of the plurality of tax returns, at the at least one calculating device, from the third party tax software application;

performing processing associated with providing the prepared results of each of the plurality of tax returns, from the at least one calculating device, to the user associated with each of the plurality of tax returns;

performing processing associated with receiving at least one command from at least one of the users to prepare and file at least one of the plurality of tax returns or to recalculate at least one of the tax returns;

in response to the at least one command to file at least one of the plurality of tax returns, performing processing associated with processing the prepared results of the one of the plurality of tax returns to be filed so that at least one third party transmitting software application can utilize the prepared results to prepare and file the one of the plurality of tax returns to be filed; and performing processing associated with providing the prepared results to the third party transmitting software application so that each of the plurality of tax returns to be filed can be filed with at least one tax collecting entity.

8. The system of claim 7, wherein the at least one application is further configured for:

performing processing associated with receiving at least one response from the at least one tax collecting entity in response to providing the prepared results;

performing processing associated with processing the at least one response to generate at least one interpreted response comprising descriptive information derived from at least one code in the at least one response; and performing processing associated with providing the at least one interpreted response to at least one of the users.

9. The system of claim 7, wherein the recalculating is done so that information can be modified or errors can be corrected.

10. The system of claim 9, wherein the application is further configured for:

providing limited information about the calculated results from the at least one server to at least one call center representative.

11. The system of claim 10, wherein the limited information includes, but is not limited to:

whether or not a return has been filed;

whether or not a return has been received;

the amount of the return; or any combination thereof.

12. The system of claim 7, wherein the application is further configured for constantly taking the tax information at least one user has entered, and calculates at least one of the tax return results based on the entered tax information, so that the at least one user can know the at least one tax return results prior to transmitting to the third party transmitting software application.

* * * * *